United States Patent [19]
Suzuki

[11] Patent Number: 5,627,680
[45] Date of Patent: May 6, 1997

[54] EYEPIECE INCLUDING AN ASPHERICAL LENS SURFACE

[75] Inventor: Masami Suzuki, Yokohama, Japan

[73] Assignee: Nikon Corporation, Tokyo, Japan

[21] Appl. No.: 597,798

[22] Filed: Feb. 7, 1996

[30]     Foreign Application Priority Data

Feb. 10, 1995 [JP] Japan .................................. 7-046333

[51] Int. Cl.$^6$ .............................. G02B 25/00; G02B 3/02
[52] U.S. Cl. .......................... 359/645; 359/716; 359/792
[58] Field of Search ................................ 359/645, 716, 359/784, 792

[56]                 References Cited

U.S. PATENT DOCUMENTS

2,206,195  7/1940  König ........................................ 359/645
2,603,128  7/1952  Miles ........................................ 359/645
2,859,560  4/1958  Tackaberry ............................... 359/645
4,099,842  7/1978  Kaneko ..................................... 359/645
5,162,945  11/1992  Matsuo et al. .......................... 359/645

*Primary Examiner*—Georgia Y. Epps
*Assistant Examiner*—Evelyn A. Lester
*Attorney, Agent, or Firm*—Shapiro and Shapiro

[57]                 ABSTRACT

An eyepiece having an apparent visual angle of 40° or greater is provided, in succession from the eyepoint side, with a first lens unit G1 having positive refractive power, a second lens unit G2 having positive refractive power, and a third lens unit G3 having positive refractive power. The first lens unit G1 has a positive lens component, the second lens unit G2 has a positive lens component, and the third lens unit G3 has a cemented lens consisting of a positive lens component and a negative lens component. At least one of the lens surfaces of the first to third lens units G1 to G3 is formed into an aspherical shape.

12 Claims, 11 Drawing Sheets

SPHERICAL
ABERRATION

ASTIGMATISM

DISTORTION

SPHERICAL
ABERRATION

ASTIGMATISM

DISTORTION

SPHERICAL ABERRATION

ASTIGMATISM

DISTORTION

SPHERICAL
ABERRATION

ASTIGMATISM

DISTORTION

SPHERICAL
ABERRATION

ASTIGMATISM

DISTORTION

EYEPIECE INCLUDING AN ASPHERICAL LENS SURFACE

BACKGROUND OF THE INVENTION

1. Field of the Invention

This invention relates to an eyepiece including an aspherical lens surface, and more particularly to an eyepiece for use, for example, in a telescope, a microscope or the like.

2. Related Background Art

For example, in telescopes such as binoculars, microscopes or the like, use in made of eyepieces for further enlarging and observing a real image formed by an objective lens. It is required of these eyepieces that aberrations be corrected well over a wide angle of view.

In conventional eyepieces having a wide angle of view, it has been difficult to effect sufficiently good correction of aberrations up to the marginal portion of the field of view, and particularly to effect the correction of distortion, etc. well.

SUMMARY OF THE INVENTION

The present invention has been made in view of the above-noted problem and has as its object the provision of an eyepiece introducing an aspherical lens surface thereinto, whereby aberrations are corrected well over a wide angle of view.

To solve the above-noted problem, according to the present invention, there is provided an eyepiece having an apparent visual angle of 40° or greater comprising, in succession from the eyepoint side, a first lens unit G1 having positive refractive power, a second lens unit G2 having positive refractive power, and a third lens unit G3 having positive refractive power, the first lens unit G1 having a positive lens component, the second lens unit G2 having a positive lens component, the third lens unit G3 having a cemented lens consisting of a positive lens unit and a negative lens unit, at least one of the lens surfaces of the first to third lens units G1 to G3 being formed into an aspherical shape.

According to a preferred form of the present invention, in the first lens unit G1 or the second lens unit G2, at least one of the lens surface adjacent to the eyepoint side and the lens surface adjacent to the object side is formed into an aspherical shape, and the magnitude of the radius of curvature on the periphery of the aspherical lens surface is greater than the magnitude of the radius of curvature at the vertex.

The eyepiece of the present invention is provided, in succession from the eyepoint side, with a first lens unit G1 having positive refractive power, a second lens unit G2 having positive refractive power, and a third lens unit G3 having positive refractive power, the first lens unit G1 having a positive lens component, the second lens unit G2 having a positive lens component, the third lens unit G3 having a cemented lens consisting of a positive lens component and a negative lens component. At least one of the lens surfaces of the first to third lens units G1 to G3 is formed into an aspherical shape.

Particularly, it is desirable that in the first lens unit G1 or the second lens unit G2, at least one of the lens surface adjacent to the eyepoint side and the lens surface adjacent to the object side be formed into an aspherical shape and the magnitude of the radius of curvature on the periphery of the aspherical lens surface be made greater than the magnitude of the radius of curvature at the vertex. By the introduction of such an aspherical lens surface, the correction of distortion becomes possible and further, the eye relief (the distance from that lens surface of the eyepiece which is most adjacent to the eyepoint side to the eyepoint) can be secured sufficiently long.

Figure 1:
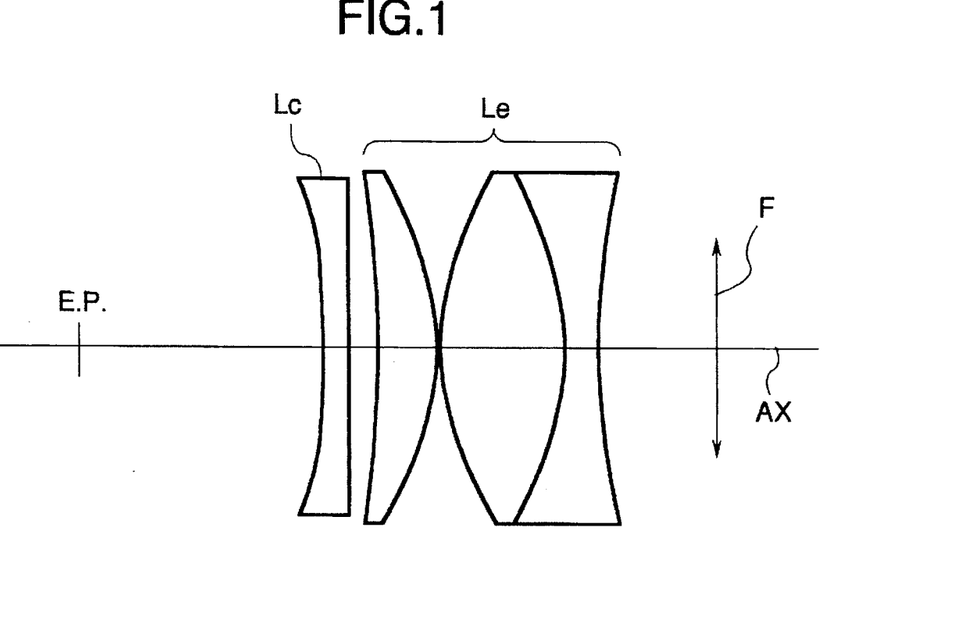
FIG. 1 illustrates the operation of the present invention for correcting the aberration of the pupil by adding a correction plate using an aspherical surface to an eyepiece.

Consider a case where distortion is corrected by adding a correction plate using an aspherical surface to an eyepiece. In FIG. 1 of the accompanying drawings, a correction plate Lc of which the surface adjacent to the eyepoint side is formed into an aspherical shape is disposed on the eyepoint (E.P.) side of a conventional eyepiece comprising a spherical lens. The distortion may be corrected by this correction plate Lc. In FIG. 1, the letter F designates an object image formed through an objective lens (not shown), and AX denotes the optical axis.

Figure 2:
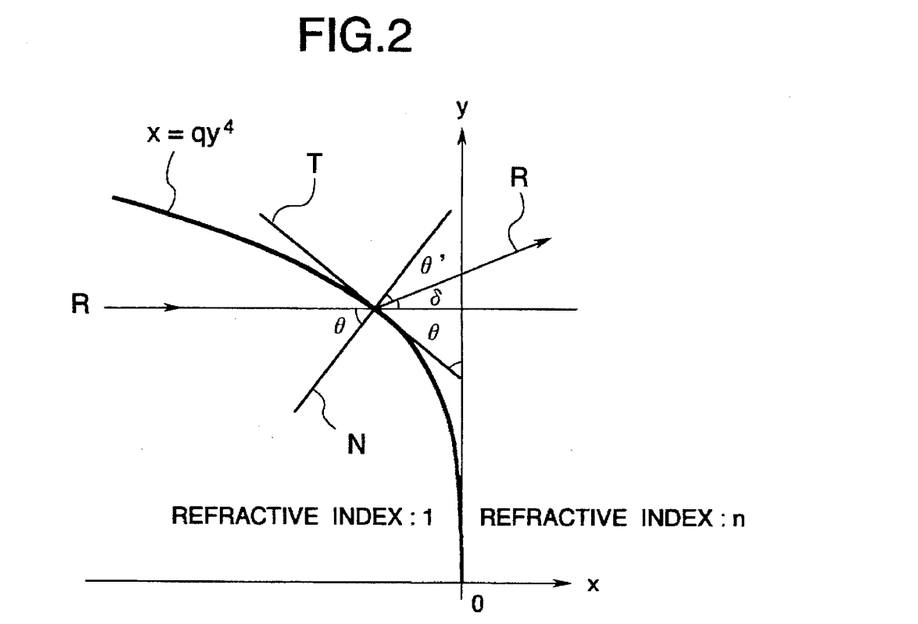
FIG. 2 shows the aspherical shape of the correction plate of FIG. 1.

FIG. 2 of the accompanying drawings show the aspherical shape of the correction plate Lc of FIG. 1. As shown in FIG. 2, with the vertex of the aspherical surface on the optical axis AX as the origin, on the basis of the x-axis provided along the optical axis AX and the y-axis provided so as to be orthogonal to the optical axis, the aspherical surface of the correction plate Lc is expressed by the following expression (1):

$$x = qy^4, \quad (1)$$

where q: a constant.

Accordingly, the angle θ formed between the tangent T of the curve $x=qy^4$ prescribing the aspherical surface and the y-axis is obtained from the following expression (2) by differentiating an expression (1):

$$\theta = 4qy^3 \quad (2)$$

Also, when the refractive index of the correction plate Lc is n and the angle formed between a ray of light R entering from the eyepoint side in parallelism to the optical axis AX and refracted by the aspherical surface and the normal N to the aspherical surface at the incidence point is θ', the angle of deviation δ of the ray of light by the aspherical surface is expressed by the following expression (3):

$$\begin{aligned} \delta &= \theta - \theta' \\ &= (1 - 1/n)\theta \\ &= 4(1 - 1/n)qy^3 \end{aligned} \quad (3)$$

On the other hand, the aberration ΔS' of the pupil by the eyepiece is expressed by the following expression (4) in the area of tertiary aberration:

$$\Delta S' = Ay^2, \quad (4)$$

where

A: a constant;

y: the height of the ray of light incident on the eyepiece.

When the magnification of the imaging of the eyepiece is β, the aberration ΔS' by the eyepiece can also be expressed by the following expression (5):

$$\Delta S' = -\beta^2 \Delta S \quad (5)$$

Assuming that the distance S from the object to the entrance pupil is sufficiently great as compared with the focal length of the eyepiece, a relation shown by the following expression (6) is established by the sine theorem.

$$\Delta S = -S^2 \delta / y \qquad (6)$$
$$= -4(1 - 1/n)qS^2y^2$$

If by substituting the above expression (6) for expression (5) and comparing it with expression (4), a relation shown by the following expression (7) is established, it will be seen that expression (4) and expression (5) coincide with each other.

$$A = 4(1 - 1/n)\beta^2 qS^2 \qquad (7)$$

Accordingly, by prescribing the shape of the aspherical surface on the basis of q which will satisfy expression (7), there can be provided an eyepiece free of distortion as a whole.

Expression (1) can be rewritten into the following expression (8):

$$x = qy^4 \qquad (8)$$
$$= A/[4(1 - 1/n)\beta^2 S^2] \cdot y^4$$

Also, $\beta = S'/S$ and hence, the above expression (8) can be rewritten into the following expression (9):

$$x = A/[4(1-1/n)S'^2] \cdot y^4, \qquad (9)$$

where

S': the eye relief of the eyepiece.

The aforementioned constant q corresponds to the fourth-order aspherical surface coefficient $C_4$ in the following general expression (10) representing the aspherical surface.

$$x = (y^2/R)/[1 + (1 - \kappa \cdot y^2/R^2)^{1/2}] + C_4 \cdot y^4 + C_6 \cdot y^6 + C_8 \cdot y^8 + C_{10} \cdot y^{10} +, \qquad (10)$$

where y: the height in a direction perpendicular to the optical axis;

x: the amount of displacement of the lens surface in the direction of the optical axis at the height y;

R: the radius of curvature at the vertex of the aspherical surface;

κ: cone coefficient;

$C_n$: nth-order aspherical surface coefficient.

The vertex of the aspherical surface is on the optical axis, and x and y have this vertex as their origin.

As described above, in expression (9), S' is the eye relief of the eyepiece and therefore, the value thereof may usually be considered to be of the order of 10 mm to 30 mm. Depending on the construction of the eyepiece, the position of the entrance pupil, the focal length, etc., the constant A varies. However, to effect the correction of distortion well for the constant A of an ordinary eyepiece, it is preferable that the fourth-order aspherical surface coefficient $C_4$ in the expression (10) of the aspherical surface satisfy the following conditional expression (11):

$$|C_4| \leq 1 \times 10^{-3} \qquad (11)$$

To effect not only the correction of distortion but also the better correction of astigmatism, it is preferable that the fourth-order aspherical surface coefficient $C_4$ satisfy the following conditional expression (12):

$$1 \times 10^{-7} < |C_4| < 1 \times 10^{-3} \qquad (12)$$

If the fourth-order aspherical surface coefficient $C_4$ exceeds the upper limit value of conditional expression (12), distortion will become over-corrected, and this is not preferable.

If conversely, the fourth-order aspherical surface coefficient $C_4$ exceeds the lower limit value of conditional expression (12), distortion will become under-corrected, and this is not preferable.

In the foregoing description, the correction plate Lc is disposed on the eyepoint side of the eyepiece Le, but a similar result will be obtained even if the correction plate Lc is disposed on the object side of the eyepiece Le.

Next, consider a case where the vertex curvature $C_0 = 1/R$ is not 0, that is, the coefficient of the term of $y^2$ is not 0. That is, it is to be understood that the aspherical shape is expressed by the following expression (13):

$$x = py^2 + qy^4, \qquad (13)$$

where p: a constant.

As in the foregoing description, the angle θ formed between the tangent of the curve $x = py^2 + qy^4$ prescribing the aspherical surface and the y-axis and the aberration ΔS' of the pupil are expressed by the following expressions (14) and (15), respectively:

$$\theta = 2py + 4qy^3 \qquad (14)$$

$$\Delta S' = 2(1 - 1/n)\beta^2 pS^2 + \qquad (15)$$
$$(1 - 1/n)\beta^2 qS^2 y^2$$

The second term in the above expression (15) is the same as the aberration of the pupil when the vertex curvature $C_0 = 1/R$ is 0. The first term is a constant term not including $y^2$, i.e., a term representing the movement of the image point based on the vertex curvature $C_0$, and has nothing to do with the correction of distortion. Accordingly, even if a curved surface (a quadratic surface) corresponding to the term of $y^2$ is included in the aspherical surface of the correction plate Lc, in other words, even if the correction plate Lc is a lens having refractive power, only the term of $y^4$ affects the correction of distortion. Therefore, as long as the value of the fourth-order aspherical surface coefficient $C_4$ satisfies conditional expression (11), and further preferably, satisfies conditional expression (12), the aberration of the pupil can be corrected well.

Description has been made of only the case where the curved surface corresponding to the term of $y^4$ is included in the aspherical shape of the correction plate Lc, and this is because in the area of tertiary aberration, distortion is completely corrected by only the term of $y^4$. However, the more is widened the angle of view of the eyepiece, the greater becomes the deviation from the area of tertiary aberration and therefore, it becomes impossible to completely correct distortion by only the correction plate Lc having the above-described aspherical surface represented by only the term of $y^4$. In that case, besides the term of $y^4$, a higher order correction term can be added to the aspherical shape of the correction plate Lc.

Also, when in the first lens unit G1 or the second lens unit G2, at least one of the lens surface adjacent to the eyepoint side and the lens surface adjacent to the object side is formed into an aspherical shape, it is preferable that the following conditional expression (16) be satisfied:

$$1 \times 10^{-2} < |dx/h| < 1 \times 10^{-1}, \qquad (16)$$

where dx: the distance along the optical axis between the incidence position of the principal ray farthest from the optical axis on the aspherical surface and the incidence position of the principal ray farthest from the optical axis on the spherical surface based on the radius of curvature of the vertex of the aspherical surface;

h: the distance of the incidence position of the principal ray farthest from the optical axis on the aspherical surface from the optical axis.

If the upper limit value of conditional expression (16) is exceeded, distortion will become over-corrected, and this is not preferable.

If conversely, the lower limit value of conditional expression (16) is exceeded, distortion will become under-corrected, and this is not preferable.

Also, when in the first lens unit G1 or the second lens unit G2, at least one of the lens surface adjacent to the eyepoint side and the lens surface adjacent to the object side is formed into an aspherical shape, it is preferable that in the lens unit into which the aspherical surface is introduced, the following conditional expression (17) be satisfied:

$$(r2+r1)/(r2-r1)<-1, \quad (17)$$

where r1: the radius of curvature of the vertex of the lens surface adjacent to the eyepoint side;

r2: the radius of curvature of the vertex of the lens surface adjacent to the object side.

Conditional expression (17) prescribes an appropriate range about the shape of the lens unit into which the aspherical surface is introduced.

If the upper limit value of conditional expression (17) is exceeded, the flatness of the image plane will become unable to be kept, and this is not preferable.

DESCRIPTION OF THE PREFERRED EMBODIMENTS

In each embodiment, the eyepiece of the present invention is provided, in succession from the eyepoint side, with a first lens unit G1 having positive refractive power, a second lens unit G2 having positive refractive power, and a third lens unit G3 having positive refractive power, the first lens unit G1 having a positive lens component, the second lens unit G2 having a positive lens component, the third lens unit G3 having a cemented lens consisting of a positive lens component and a negative lens component, at least one of the lens surfaces of the first to third lens units G1 to G3 being formed into an aspherical shape.

Each embodiment of the present invention and a comparative example will hereinafter be described with reference to the accompanying drawings.

[First Embodiment]

Figure 3:
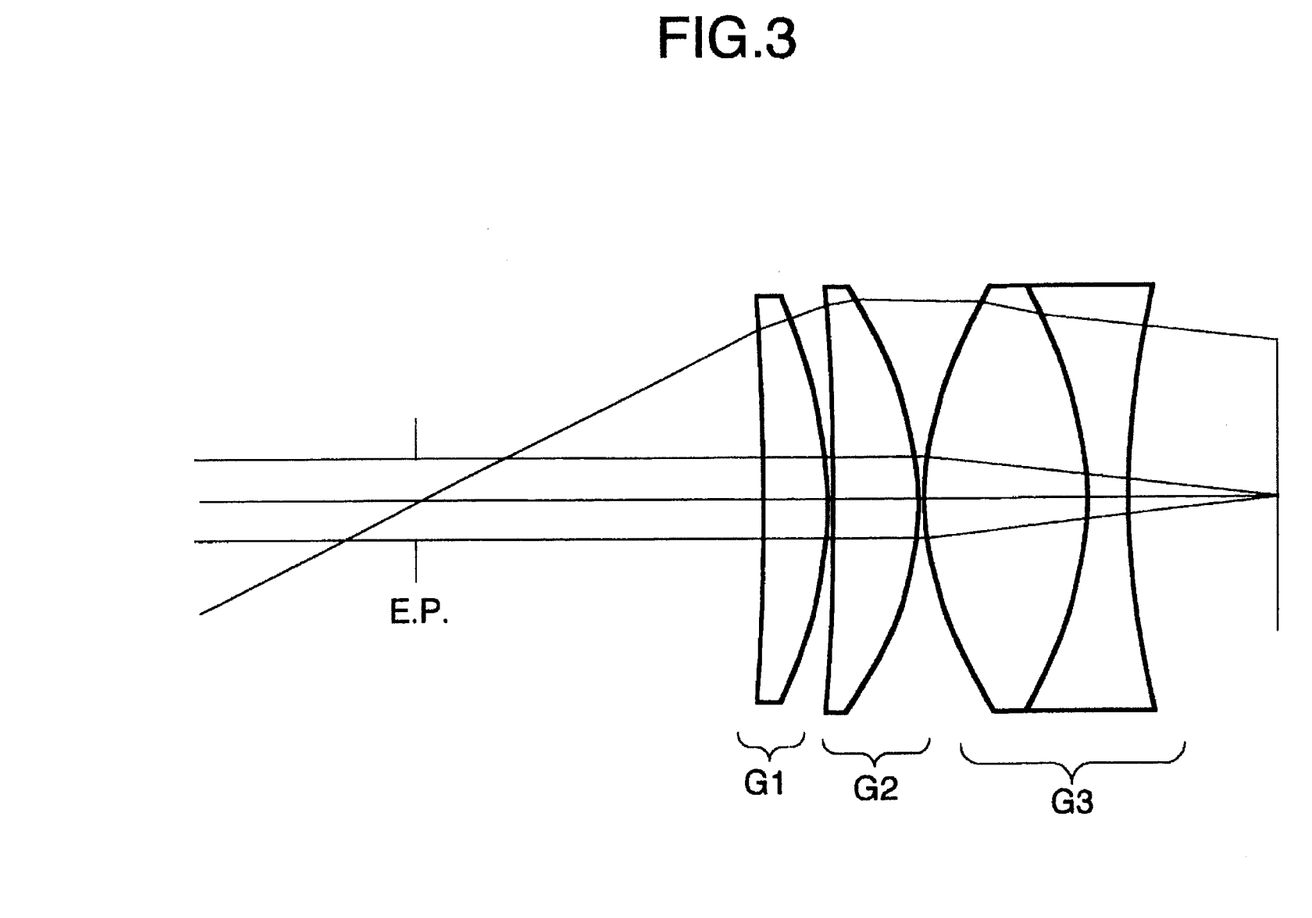
FIG. 3 shows the lens construction of an eyepiece including an aspherical lens surface according to a first embodiment of the present invention.

FIG. 3 shows the lens construction of an eyepiece according to a first embodiment of the present invention.

The eyepiece shown in FIG. 3 is comprised, in succession from the eyepoint side, of a first lens unit G1 comprising a positive meniscus lens having its concave surface facing the eyepoint side, a second lens unit G2 comprising a positive meniscus lens having its concave surface facing the eyepoint side, and a third lens unit G3 comprising a cemented positive lens consisting of a biconvex lens and a biconcave lens.

That surface of the positive meniscus lens of the first lens unit G1 which is adjacent to the object side is formed into an aspherical surface. The first lens unit G1 is formed of optical glass.

The numerical values of the first embodiment of the present invention are shown in Table 1 below. In Table 1, f represents the focal length, and 2ω represents the angle of view. Further, the numbers i at the left end represent the order of the lens surfaces from the eyepoint side. r represents the radius of curvature of each lens surface, d represents the spacing between adjacent lens surfaces, and n and ν represent the refractive indices and the abbe numbers, respectively, for d-line (λ=587.6 nm).

Also, in each embodiment, when the height in a direction perpendicular to the optical axis with the vertex of the aspherical lens surface on the optical axis as the origin is y and the amount of displacement of the surface in the direction of the optical axis at the height y is x and the fiducial radius of curvature i.e., the radius of curvature of the vertex of the aspherical lens surface is R and the cone coefficient is κ and the nth-order aspherical lens surface coefficient is $C_n$, the aspherical lens surface is expressed by the following mathematical expression (a):

$$x=(y^2/R)/[1+(1-\kappa \cdot y^2/R^2)^{1/2}]+C_4 \cdot y^4+C_6 \cdot y^6+C_8 \cdot y^8+C_{10} \cdot y^{10}+ \quad (a)$$

The aspherical lens surface in the table of each embodiment is given a mark * at the right of its surface number.

TABLE 1 f = 14.5 mm
2ω = 59.2°
eye relief 16.6

| i | r | d | n | ν |
|---|---|---|---|---|
| 1 | −153.2 | 3.0 | 1.517 | 64.1 |
| 2* | −20.0 | 0.2 | | |
| 3 | −100.0 | 4.0 | 1.713 | 53.9 |
| 4 | −18.1 | 0.2 | | |
| 5 | 19.6 | 7.5 | 1.620 | 60.1 |

TABLE 1-continued

| | | | | |
|---|---|---|---|---|
| 6 | −21.0 | 2.0 | 1.805 | 25.3 |
| 7 | 40.0 | | | |

(aspherical lens surface data)

| | κ | $C_4$ | $C_6$ | $C_8$ | $C_{10}$ |
|---|---|---|---|---|---|
| second surface | −2.26 | $0.11 \times 10^{-4}$ | $-0.35 \times 10^{-6}$ | $0.64 \times 10^{-8}$ | $-0.30 \times 10^{-10}$ |

(condition-corresponding values)

Figures 4A, 4B:
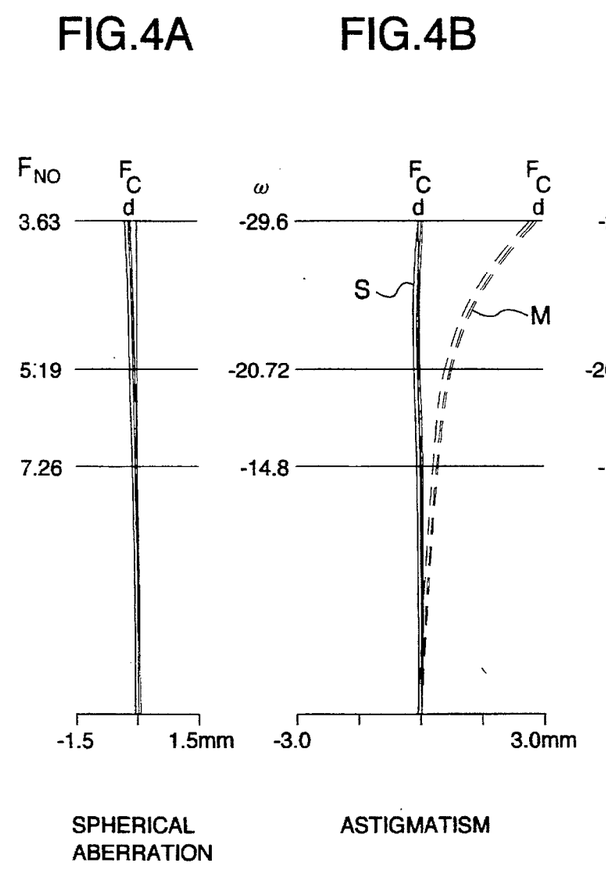
FIGS. 4A to 4C show the aberrations of the first embodiment.
Figure 4C:
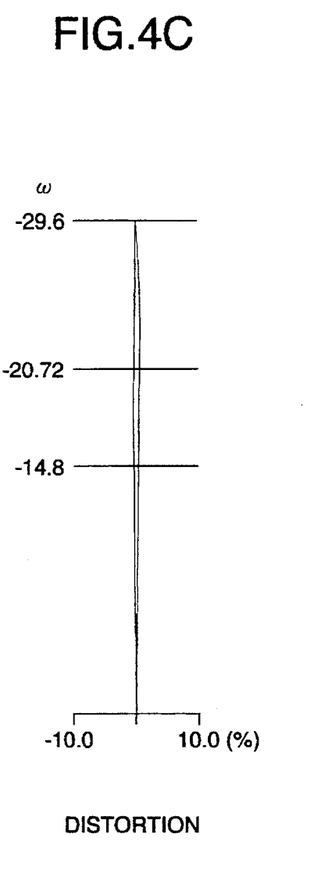

(11) and (12) $|C_4| = 0.11 \times 10^{-4}$
(16) $kdx/hl = 0.055$
(17) $(r2 + r1)/(r2 - r1) = -1.3$ Referring to FIGS. 4A to 4C which show the aberrations of the first embodiment, the aberrations are those when a ray of light is pursued from the eyepoint side.

In these figures, FNO represents the F number, ω represents the value of a half of the angle of view, d represents d-line (λ=587.6 nm), F represents F-line (λ=486.1 nm), and C represents C-line (λ=656.3 nm). Also, in the figure showing astigmatism, the solid line S indicates the sagittal image plane and the broken line M indicates the meridional image plane.

As is apparent from these figures, in the present embodiment, the aberrations are corrected well over a wide angle of view (2ω=59.2°). Particularly, distortion could be suppressed to nearly zero over a wide angle of view.

[Second Embodiment]

Figure 5:
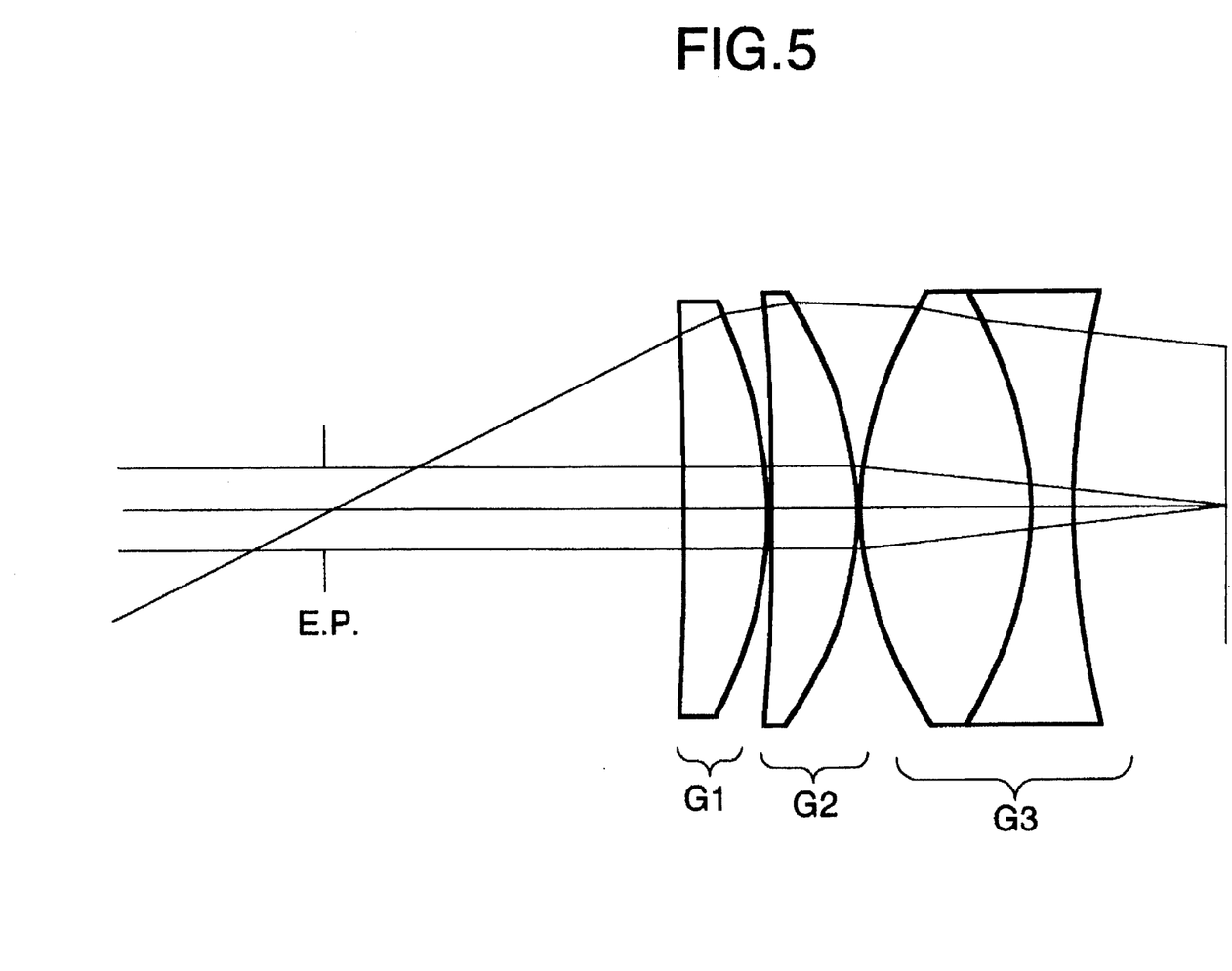
FIG. 5 shows the lens construction of an eyepiece including an aspherical lens surface according to a second embodiment of the present invention.

FIG. 5 shows the lens construction of an eyepiece according to a second embodiment of the present invention.

The eyepiece shown in FIG. 5 is comprised, in succession from the eyepoint side, of a first lens unit G1 comprising a positive meniscus lens having its concave surface facing the eyepoint side, a second lens unit G2 comprising a positive meniscus lens having its concave surface facing the eyepoint side, and a third lens unit G3 comprising a cemented positive lens consisting of a biconvex lens and a biconcave lens.

That surface of the positive meniscus lens of the first lens unit G1 which is adjacent to the object side is formed into an aspherical shape. The first lens unit G1 is formed of an optical material made of resin.

The numerical values of the second embodiment of the present invention are shown in Table 2 below. In Table 2, f represents the focal length, and 2ω represents the angle of view. Further, the number i at the left end represent the order of the lens surfaces from the eyepoint side, r represents the radius of curvature of each lens surface, d represents the spacing between adjacent lens surfaces, and n and ν represent the refractive indices and the abbe numbers, respectively, for d-line (λ=587.6 nm).

TABLE 2 f = 14.5 mm
2ω = 59.2°
eye relief 16.5

| i | r | d | n | ν |
|---|---|---|---|---|
| 1 | −3338.8 | 4.0 | 1.491 | 57.6 |
| 2* | −18.0 | 0.2 | | |
| 3 | −100.0 | 3.8 | 1.713 | 53.9 |
| 4 | −20.0 | 0.2 | | |
| 5 | 19.6 | 7.7 | 1.620 | 60.1 |
| 6 | −18.0 | 2.0 | 1.805 | 25.3 |
| 7 | 40.0 | | | |

TABLE 2-continued (aspherical lens surface data)

| | κ | $C_4$ | $C_6$ | $C_8$ | $C_{10}$ |
|---|---|---|---|---|---|
| second surface | −0.42 | $0.13 \times 10^{-4}$ | $-0.89 \times 10^{-7}$ | $0.18 \times 10^{-8}$ | $-0.85 \times 10^{-11}$ |

(condition-corresponding values)

Figure 6A:
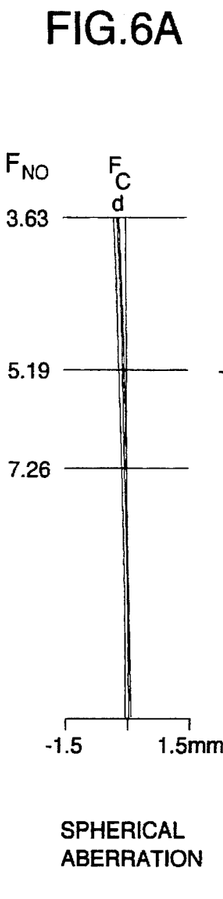
FIGS. 6A to 6C show the aberrations of the second embodiment.
Figure 6B:
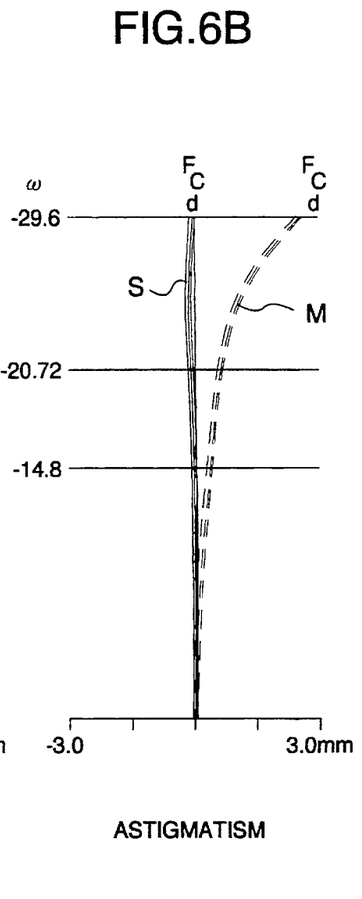
Figure 6C:
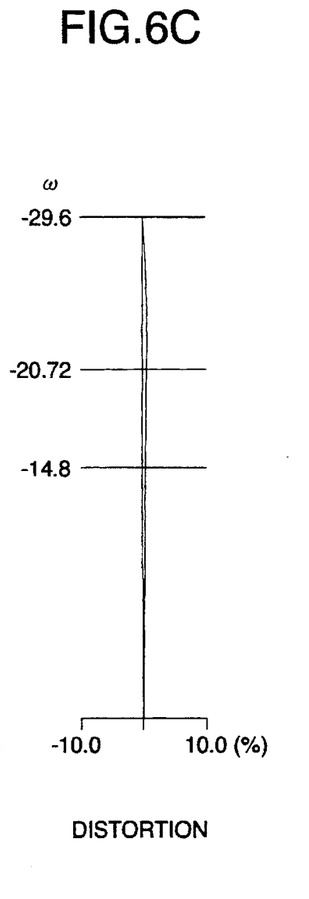

(11) and (12) $|C_4| = 0.13 \times 10^{-4}$
(16) $kdx/hl = 0.047$
(17) $(r2 + r1)/(r2 - r1) = -0.011$ Referring to FIGS. 6A to 6C which show the aberrations of the second embodiment, the aberrations are those when a ray of light is pursued from the eyepoint side.

In these figures, FNO represents the F number, ω represents the value of a half of the angle of view, d represents d-line (λ=587.6 nm), F represents F-line (λ=486.1 nm), and C represents C-line (λ=656.3 nm). Also, in the figure showing astigmatism, the solid line S indicates the sagittal image plane and the broken line M indicates the meridional image plane.

As is apparent from these figures, in the present embodiment, the aberrations are corrected well over a wide angle of view (2ω=59.2°). Particularly, distortion could be suppressed to nearly zero over a wide angle of view.

[Third Embodiment]

Figure 7:
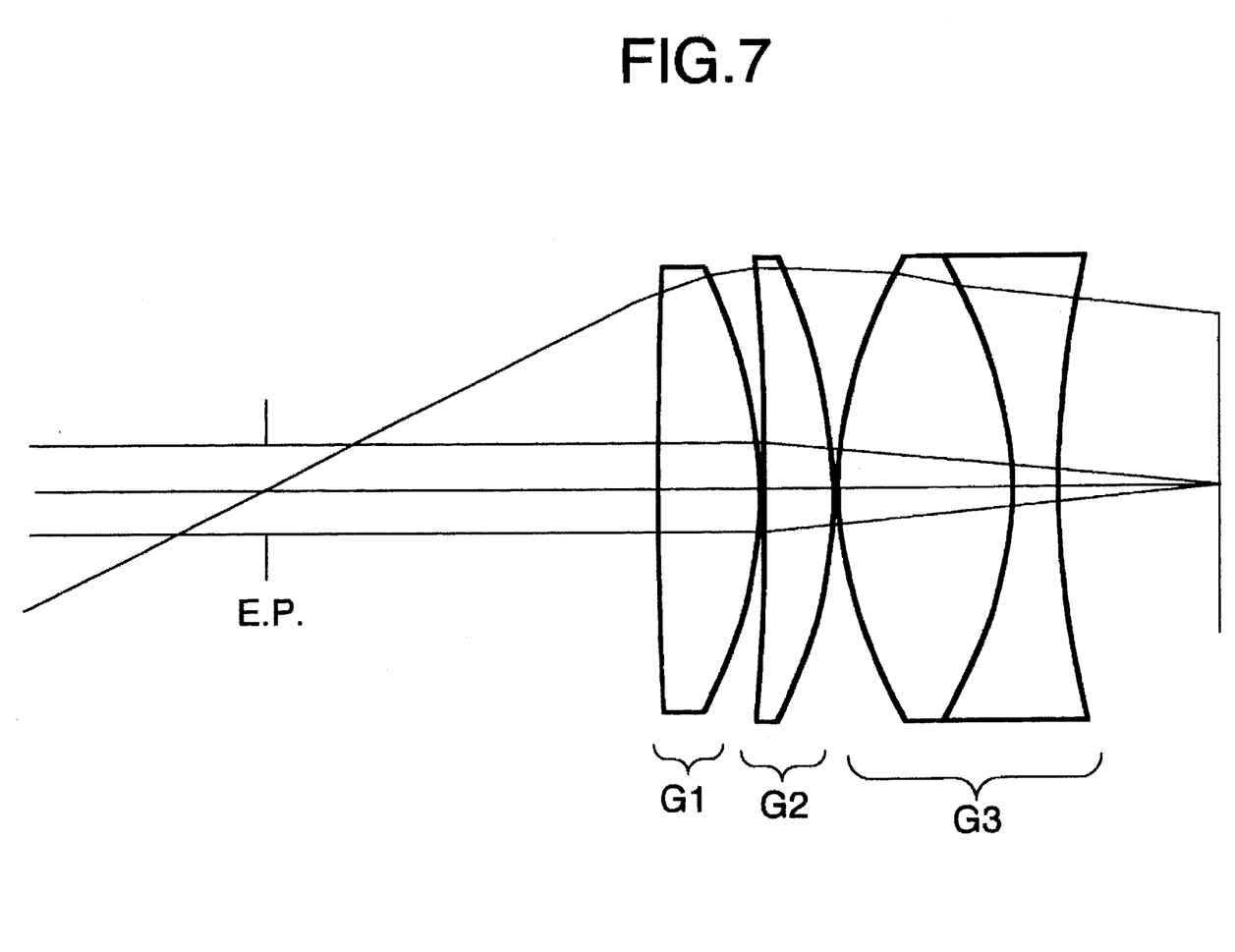
FIG. 7 shows the lens construction of an eyepiece including an aspherical lens surface according to a third embodiment of the present invention.

FIG. 7 shows the lens construction of an eyepiece according to a third embodiment of the present invention.

The eyepiece shown in FIG. 7 is comprised, in succession from the eyepoint side, of a first lens unit G1 comprising a biconvex lens, a second lens unit G2 comprising a positive meniscus lens having its concave surface facing the eyepoint side, and a third lens unit G3 comprising a cemented positive lens consisting of a biconvex lens and a biconcave lens.

That surface of the positive meniscus lens of the second lens unit G2 which is adjacent to the object side is formed into an aspherical shape. The second lens unit G2 is formed of optical glass.

The numerical values of the third embodiment of the present invention are shown in Table 3 below. In Table 3, f represents the focal length, and 2ω represents the angle of view. Further, the numbers i at the left end represent the order of the lens surfaces from the eyepoint side, r represents the radius of curvature of each lens surface, d represents the spacing between adjacent lens surfaces, and n and ν represent the refractive indices and the abbe numbers, respectively, for d-line (λ=587.6 nm).

TABLE 3 f = 14.5 mm
2ω = 59.2°
eye relief 17.0

| i | r | d | n | ν |
|---|---|---|---|---|
| 1 | 169.5 | 4.5 | 1.589 | 61.1 |
| 2 | −19.1 | 0.2 | | |
| 3 | −100.0 | 3.0 | 1.713 | 53.9 |
| 4* | −23.0 | 0.2 | | |
| 5 | 20.7 | 7.0 | 1.620 | 60.1 |
| 6 | −20.0 | 2.0 | 1.805 | 25.3 |
| 7 | 40.0 | | | |

TABLE 3-continued (aspherical lens surface data)

| | κ | $C_4$ | $C_6$ | $C_8$ | $C_{10}$ |
|---|---|---|---|---|---|
| fourth surface | −0.33 | $0.90 \times 10^{-5}$ | $0.58 \times 10^{-7}$ | $-0.14 \times 10^{-9}$ | $-0.92 \times 10^{-12}$ |

(condition-corresponding values)

Figure 8A:
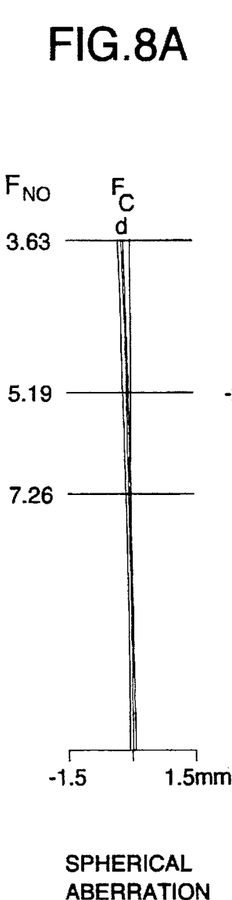
FIGS. 8A to 8C show the aberrations of the third embodiment.
Figure 8B:
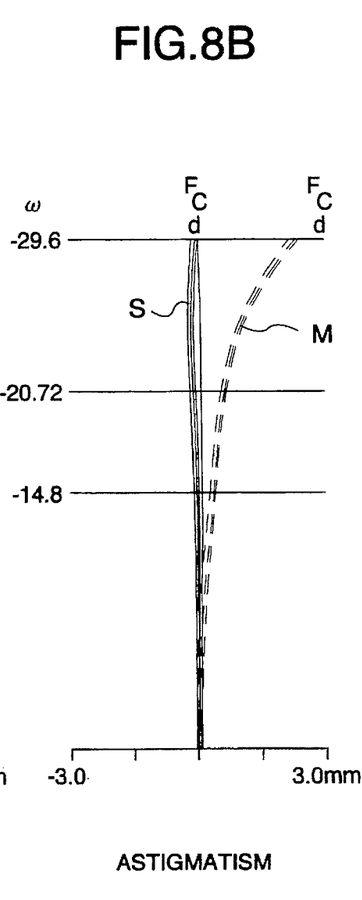
Figure 8C:
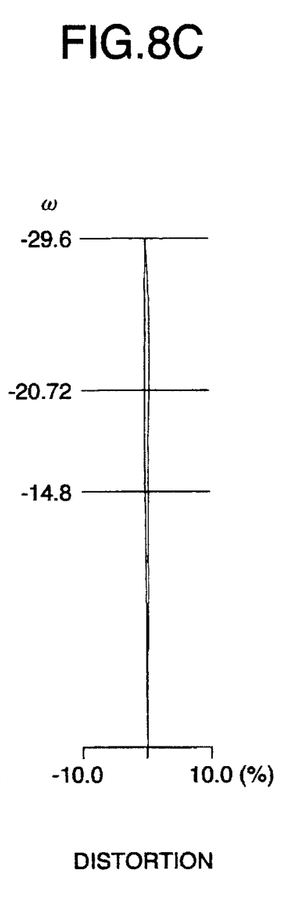

(11) and (12) $|C_4| = 0.90 \times 10^{-5}$
(16) $|dx/h| = 0.027$
(17) $(r2 + r1)/(r2 − r1) = −1.597$ Referring to FIGS. 8A to 8C which show the aberrations of the third embodiment, the aberrations are those when a ray of light is pursued from the eyepoint side.

In these figures, FNO represents the F number, ω represents the value of a half of the angle of view, d represents d-line (λ=587.6 nm), F represents F-line (λ=486.1 nm), and C represents C-line (λ=656.3 nm). Also, in the figure showing astigmatism, the solid line S indicates the sagittal image plane, and the broken line M indicates the meridional plane.

As is apparent from these figures, in the present embodiment, the aberrations are corrected well over a wide angle of view (2ω=59.2°). Particularly, distortion could be suppressed to nearly zero over a wide angle of view.

[Fourth Embodiment]

Figure 9:
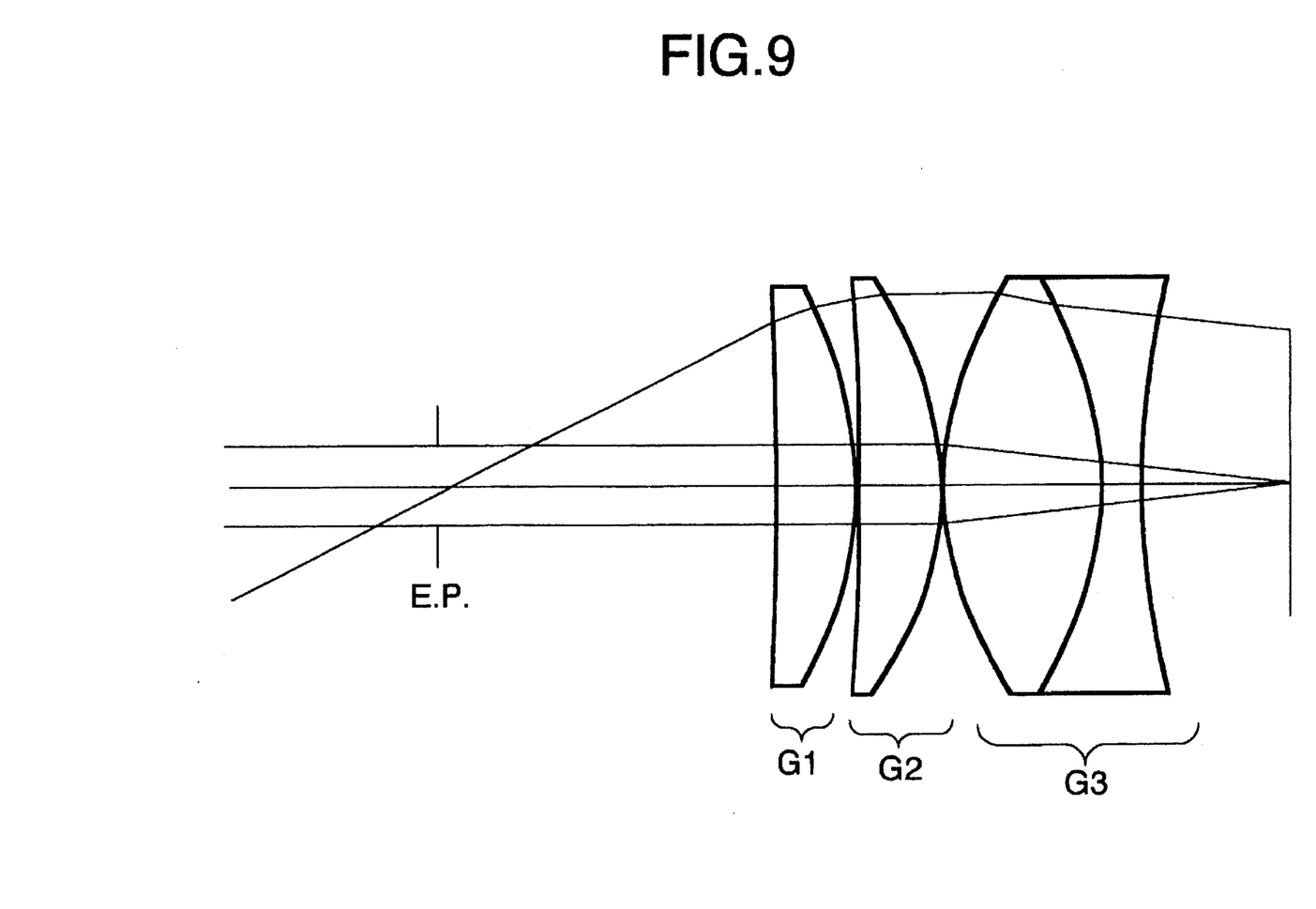
FIG. 9 shows the lens construction of an eyepiece including an aspherical lens surface according to a fourth embodiment of the present invention.

FIG. 9 shows the lens construction of an eyepiece according to a fourth embodiment of the present invention.

The eyepiece shown in FIG. 9 is comprised, in succession from the eyepoint side, of a first lens unit G1 comprising a positive meniscus lens having its concave surface facing the eyepoint side, a second lens unit G2 comprising a positive meniscus lens having its concave surface facing the eyepoint side, and a third lens unit G3 comprising a cemented positive lens consisting of a biconvex lens and a biconcave lens.

That surface of the positive meniscus lens of the second lens unit G2 which is adjacent to the object side is formed into an aspherical shape. The second lens unit G2 is formed of an optical material made of resin.

The numerical values of the fourth embodiment of the present invention are shown in Table 4 below. In Table 4, f represents the focal length, and 2ω represents the angle of view. Further, the numbers i at the left end represent the order of the lens surfaces from the eyepoint side, r represents the radius of curvature of each lens surface, d represents the spacing between adjacent lens surfaces, and n and ν represent the refractive indices and the abbe numbers, respectively, for d-line (λ=587.6 nm).

TABLE 4 f = 14.5 mm
2ω = 59.2°
eye relief 16.2

| i | r | d | n | ν |
|---|---|---|---|---|
| 1 | −167.9 | 4.0 | 1.589 | 61.1 |
| 2 | −18.0 | 0.2 | | |
| 3 | −80.0 | 3.7 | 1.491 | 57.6 |
| 4* | −17.0 | 0.2 | | |
| 5 | 17.6 | 7.3 | 1.620 | 60.1 |
| 6 | −20.0 | 2.0 | 1.805 | 25.3 |
| 7 | 40.0 | | | |

TABLE 4-continued (aspherical lens surface data)

| | κ | $C_4$ | $C_6$ | $C_8$ | $C_{10}$ |
|---|---|---|---|---|---|
| fourth surface | −0.36 | $0.48 \times 10^{-5}$ | $-0.51 \times 10^{-7}$ | $-0.14 \times 10^{-9}$ | $0.95 \times 10^{-12}$ |

(condition-corresponding values)

Figures 10A, 10B:
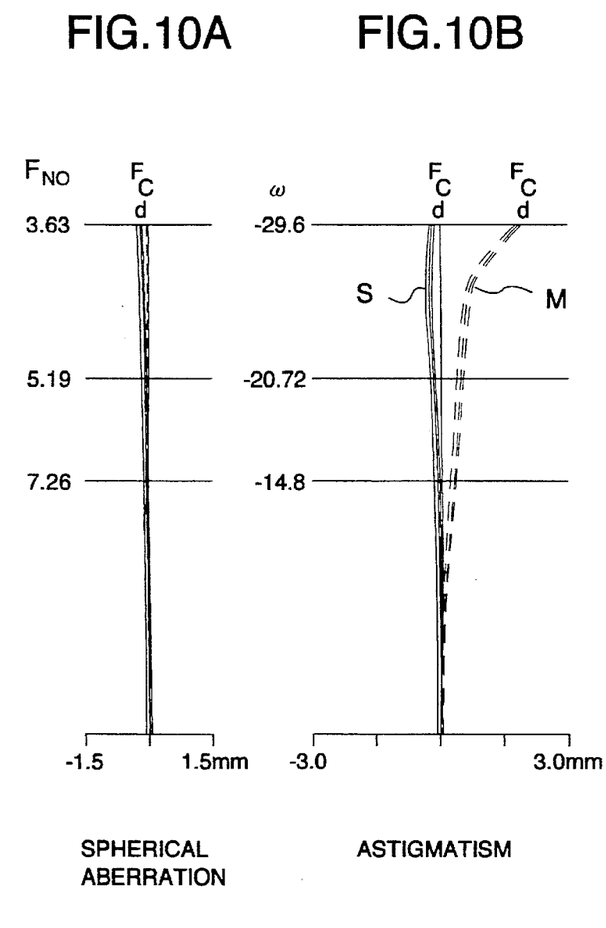
FIGS. 10A to 10C show the aberrations of the fourth embodiment.
Figure 10C:
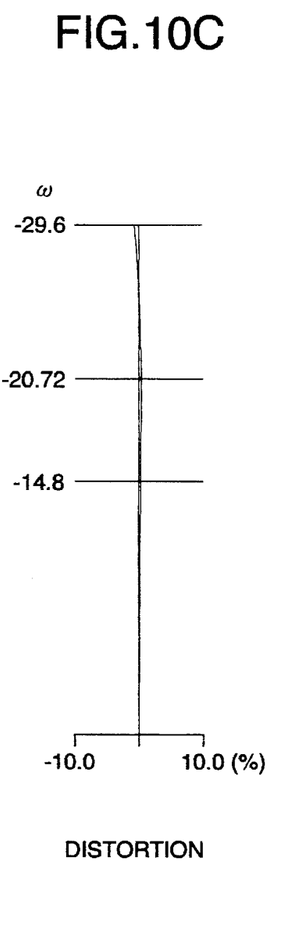

(11) and (12) $|C_4| = 0.48 \times 10{-5}$
(16) $|dx/h| = 0.039$
(17) $(r2 + r1)/(r2 − r1) = −1.540$ Referring to FIGS. 10A to 10C which show the aberrations of the fourth embodiment, the aberrations are those when a ray of light is pursued from the eyepoint side.

In these figures, FNO represents the F number, ω represents the value of a half of the angle of view, d represents d-line (λ=587.6 nm), F represents F-line (λ=486.1 nm), and C represents C-line (λ=656.3 nm). In the figure showing astigmatism, the solid line S indicates the sagittal image plane, and the broken line M indicates the meridional image plane.

As is apparent from these figures, in the present embodiment, the aberrations are corrected well over a wide angle of view (2ω=59.2°). Particularly, distortion could be suppressed to nearly zero over a wide angle of view.

COMPARATIVE EXAMPLE

Figure 11:
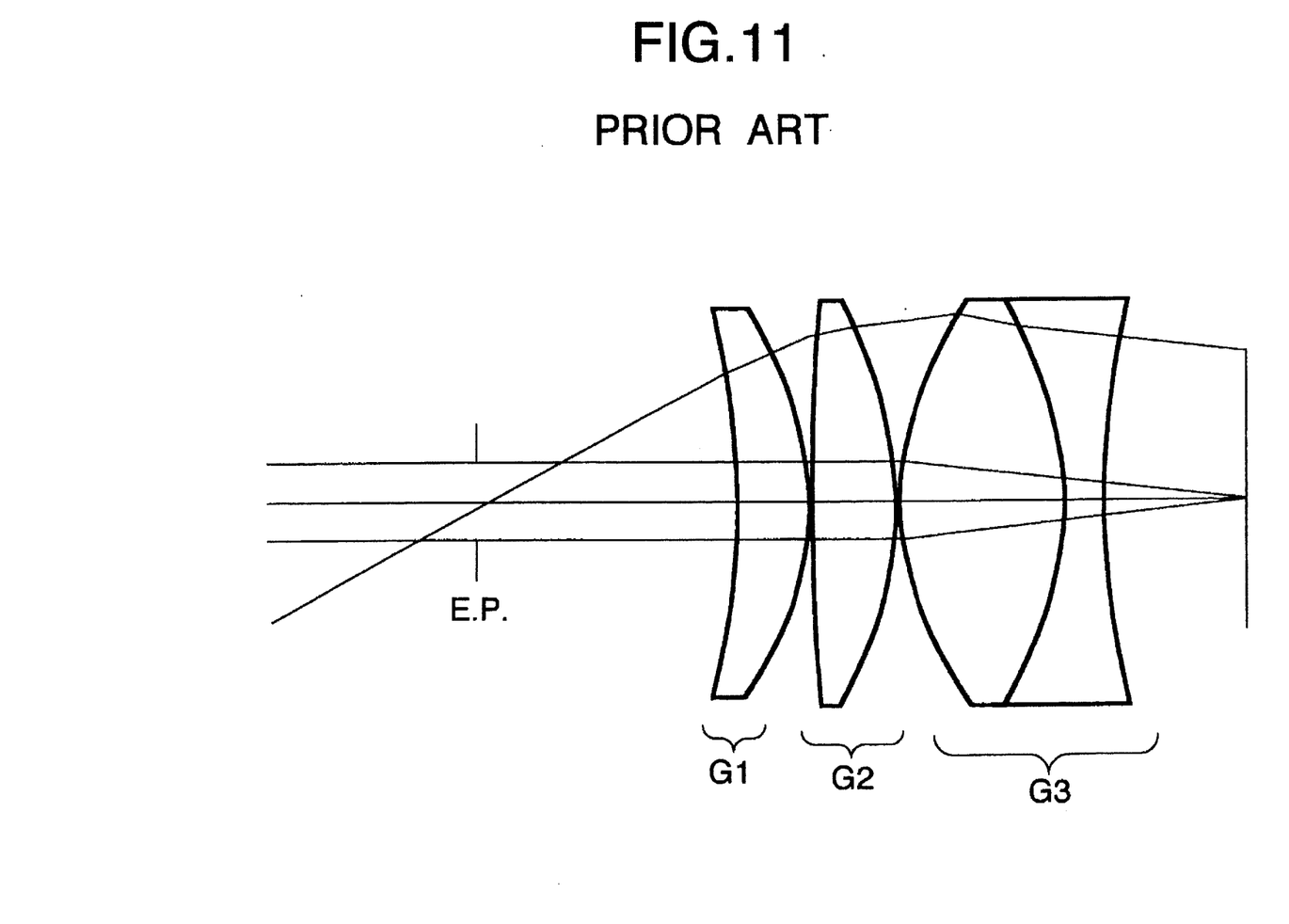
FIG. 11 shows the lens construction of a conventional eyepiece according to a comparative example.

FIG. 11 shows the lens construction of a conventional eyepiece according to a comparative example.

The eyepiece shown in FIG. 11 is comprised, in succession from the eyepoint side, of a first lens unit G1 comprising a positive meniscus lens having its concave surface facing the eyepoint side, a second lens unit G2 comprising a biconvex lens, and a third lens unit G3 comprising a cemented positive lens consisting of a biconvex lens and a biconcave lens. All the lens surfaces of the eyepiece of FIG. 11 are formed into a spherical shape.

The numerical values of the comparative example are shown in Table 5 below. In Table 5, f represents the focal length, and 2ω represents the angle of view. Further, the numbers i at the left end represent the order of the lens surfaces from the eyepoint side, r represents the radius of curvature of each lens surface, d represents the spacing between adjacent lens surfaces, and n and ν represent the refractive indices and the abbe numbers, respectively, for d-line (λ=587.6 nm).

TABLE 5 f = 14.5 mm
2ω = 59.2°
eye relief 13.0

| i | r | d | n | ν |
|---|---|---|---|---|
| 1 | −36.8 | 3.5 | 1.517 | 64.1 |
| 2 | −17.0 | 0.2 | | |
| 3 | 250.4 | 4.0 | 1.620 | 60.1 |
| 4 | −23.9 | 0.2 | | |
| 5 | 16.2 | 8.0 | 1.620 | 60.1 |
| 6 | −22.1 | 2.0 | 1.805 | 25.3 |
| 7 | 43.0 | | | |

Figure 12A:
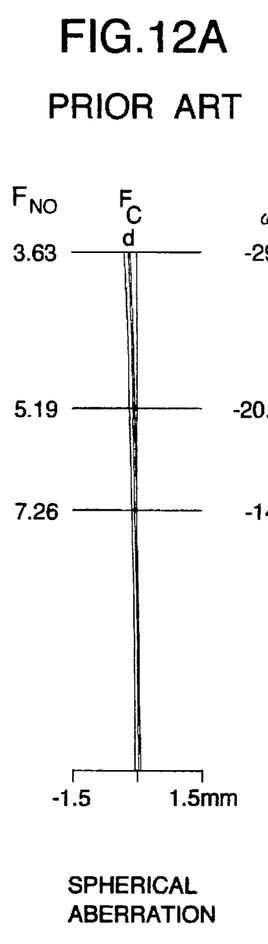
FIGS. 12A to 12C show the aberrations of the comparative example.
Figure 12B:
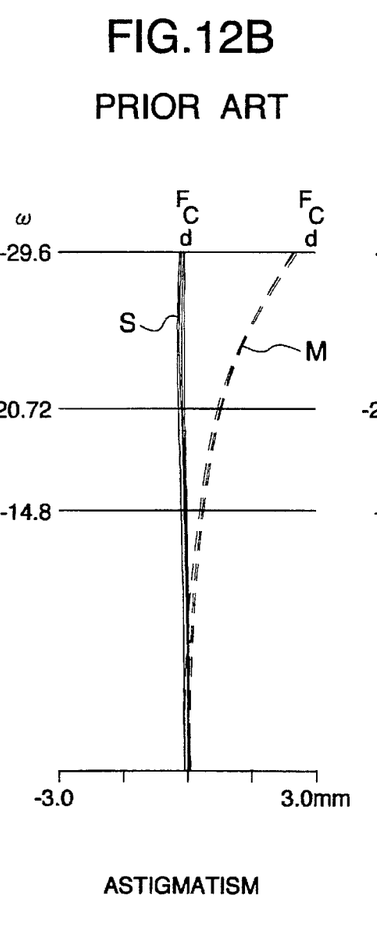
Figure 12C:
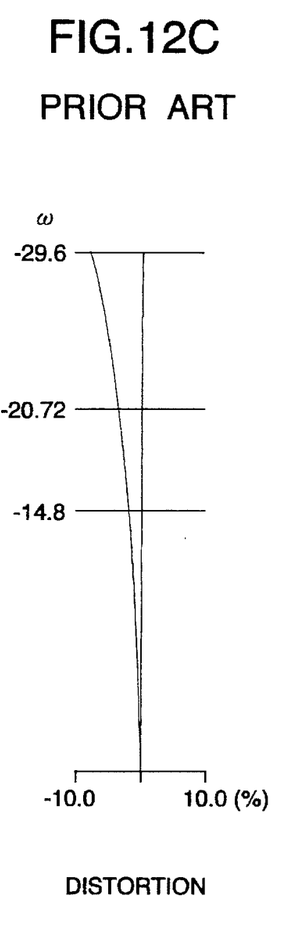

Referring to FIGS. 12A to 12C which show the aberrations of the comparative example, the aberrations are those when a ray of light is pursued from the eyepoint side.

In these figures, FNO represents the F number, ω represents the value of a half of the angle of view, d represents d-line (λ=587.6 nm), F represents F-line (λ=486.1 nm), and C represents C-line (λ=656.3 nm). In the figure showing astigmatism, the solid line S indicates the sagittal image plane, and the broken line M indicates the meridional image plane.

As is apparent from these figures, in the comparative example, distortion increases as the angle of view becomes greater.

When the aberration graphs of the comparative example shown in FIGS. 12A to 12C are compared with the aberration graphs of the first to fourth embodiments shown in FIGS. 4A to 4C, 6A to 6C, 8A to 8C and 10A to 10C, it is seen that such an aspherical lens surface that the magnitude of the radius of curvature on the periphery is greater than the magnitude of the radius of curvature at the vertex is introduced into that lens surface of the first lens unit G1 or the second lens unit G2 which is adjacent to the object side, whereby distortion is greatly improved over a wide angle of view.

Also, when Table 5 showing the numerical values of the comparative example is compared with Tables 1 to 4 showing the numerical values of the first to fourth embodiments, it is seen that the eye relief which was about 90% of the focal length in the eyepiece of the comparative example using only the spherical lenses is of the order of 112 to 117% of the focal length in each embodiment, that is, becomes longer by about 24 to 30%.

As can be seen from the above-described embodiments, the first lens unit G1 and the second lens unit G2 into which the aspherical lens surface is introduced may be formed of optical glass or an optical material made of resin.

Also, in each of the above-described embodiments, an example of the field of view 59.2° has been showing, but if the lens diameter may become large, it is possible to maintain a sufficient optical performance up to the order of an apparent visual angle 70°.

Further, while in the above-described embodiments, that lens surface of the first lens unit G1 or the second lens unit G2 which is adjacent to the object side has been shown as being formed into an aspherical surface, at least one of the lens surfaces of the first to third lens units G1 to G3 may be formed into an aspherical shape, whereby the effect of the present invention can be obtained.

As described above, according to the present invention, there can be realized an eyepiece in which aberrations are corrected well over a wide angle of view.

What is claimed is:

1. An eyepiece having an apparent visual angle of 40° or greater comprising in succession from an eyepoint side:
   a first lens unit having positive refractive power, the first lens unit including a positive lens component;
   a second lens unit having positive refractive power, the second lens unit including a positive lens component; and
   a third lens unit having positive refractive power, the third lens unit including a cemented lens consisting of a positive lens component and a negative lens component,
   wherein at least one of a lens surface of said first lens unit which is adjacent to the eyepoint side and a lens surface of said first lens unit which is adjacent to an object side is an aspherical lens surface, and a magnitude of a radius of curvature on a periphery of said aspherical lens surface is greater than a magnitude of a radius of curvature at a vertex of said aspherical lens surface.

2. An eyepiece having an apparent visual angle of 40° or greater comprising in succession from an eyepoint side:
   a first lens unit having positive refractive power, the first lens unit including a positive lens component;
   a second lens unit having positive refractive power, the second lens unit including a positive lens component; and
   a third lens unit having positive refractive power, the third lens unit including a cemented lens consisting of a positive lens component and a negative lens component;
   at least one of the lens surfaces of the first, second, and third lens units being an aspherical lens surface,
   wherein, when a vertex of the aspherical lens surface on an optical axis is an origin, a height in a direction perpendicular to the optical axis is y, an amount of displacement of the aspherical lens surface in a direction of the optical axis at the height y is x, a radius of curvature at the vertex of the aspherical lens surface is R, a cone coefficient is κ, and an nth-order aspherical surface coefficient is $C_n$, said aspherical lens surface is expressed by the following numerical expression:

$$x = (y^2/R)/[1 + (1 - \kappa \cdot y^2/R^2)^{1/2}] + C_4 \cdot y^4 + C_6 \cdot y^6 + C_8 \cdot y^8 + C_{10} \cdot y^{10} + \ldots$$

and the fourth-order aspherical surface coefficient $C_4$ satisfies the following condition:

$$|C_4| \leq 1 \times 10^{-3}.$$

3. An eyepiece according to claim 2, wherein said fourth-order aspherical surface coefficient $C_4$ satisfies the following condition:

$$1 \times 10^{-7} < |C_4| < 1 \times 10^{-3}.$$

4. An eyepiece having an apparent visual angle of 40° or greater comprising in succession from an eyepoint side:
   a first lens unit having positive refractive power, the first lens unit including a positive lens component;
   a second lens unit having positive refractive power, the second lens unit including a positive lens component; and
   a third lens unit having positive refractive power, the third lens unit including a cemented lens consisting of a positive lens component and a negative lens component,
   wherein at least one of a lens surface of said first lens unit which is adjacent to the eyepoint side and a lens surface of said first lens unit which is adjacent to an object side is an aspherical lens surface, and, when a distance along an optical axis between an incidence position of a principal ray farthest from the optical axis on said aspherical lens surface and an incidence position of the principal ray farthest from the optical axis on a spherical lens surface based on a radius of curvature at a vertex of said aspherical lens surface is dx and a distance from the optical axis of the incidence position of the principal ray farthest from the optical axis on said aspherical lens surface is h, the following condition is satisfied:

$$1 \times 10^{-2} < |dx/h| < 1 \times 10^{-1}.$$

5. An eyepiece according to claim 1, wherein, when the radius of curvature at the vertex of the lens surface of said first lens unit which is adjacent to the eyepoint side is r1 and the radius of curvature at the vertex of the lens surface of said first lens unit which is adjacent to the object side is r2, the following condition is satisfied:

$$(r2+r1)/(r2-r1)<-1.$$

6. An eyepiece according to claim 1, wherein said first lens unit is formed of optical glass or an optical material made of resin.

7. An eyepiece having an apparent visual angle of 40° or greater comprising in succession from an eyepoint side:

a first lens unit having positive refractive power, the first lens unit including a positive lens component;

a second lens unit having positive refractive power, the second lens unit including a positive lens component; and a third lens unit having positive refractive power, the third lens unit including a cemented lens consisting of a positive lens component and a negative lens component, wherein at least one of a lens surface of said second lens unit which is adjacent to the eyepoint side and a lens surface of said second lens unit which is adjacent to an object side is an aspherical lens surface, and a magnitude of a radius of curvature on a periphery of said aspherical lens surface is greater than a magnitude of a radius of curvature at a vertex of said aspherical lens surface.

8. An eyepiece according to claim 7, wherein, when the vertex of the aspherical lens surface on an optical axis is an origin, a height in a direction perpendicular to the optical axis is y, an amount of displacement of the aspherical lens surface in a direction of the optical axis at the height y is x, the radius of curvature at the vertex of the aspherical lens surface is R, a cone coefficient is κ, and an nth-order aspherical surface coefficient is $C_n$, said aspherical lens surface is expressed by the following mathematical expression:

$$x = (y^2/R)/[1 + (1 - \kappa \cdot y^2/R^2)^{1/2}] +$$
$$C_4 \cdot y^4 + C_6 \cdot y^6 + C_8 \cdot y^8 + C_{10} \cdot y^{10} + \ldots$$

and the fourth-order aspherical surface coefficient $C_4$ satisfies the following condition:

$$|C_4| \leq 1 \times 10^{-3}.$$

9. An eyepiece according to claim 8, wherein said fourth-order aspherical surface coefficient $C_4$ satisfies the following condition:

$$1 \times 10^{-7} < |C_4| < 1 \times 10^{-3}.$$

10. An eyepiece according to claim 7, wherein, when a distance along an optical axis between an incidence position of a principal ray farthest from the optical axis on said aspherical lens surface and an incidence position of the principal ray farthest from the optical axis on a spherical surface based on the radius of curvature at the vertex of said aspherical lens surface is dx and a distance from the optical axis of the incidence position of the principal ray farthest from the optical axis on said aspherical lens surface is h, the following condition is satisfied:

$$1 \times 10^{-2} < |dx/h| < 1 \times 10^{-1}.$$

11. An eyepiece according to claim 7, wherein, when the radius of curvature at the vertex of the lens surface of said second lens unit which is adjacent to the eyepoint side is r1 and the radius of curvature at the vertex of the lens surface of said second lens unit which is adjacent to the object side is r2, the following condition is satisfied:

$$(r2+r1)/(r2-r1)<-1.$$

12. An eyepiece according to claim 7, wherein said second lens unit is formed of optical glass or an optical material made of resin.

* * * * *